June 5, 1951      K. J. KNUDSEN      2,556,138
TEMPERATURE CONTROL USING VACUUM TUBE
Filed May 1, 1947      3 Sheets-Sheet 1
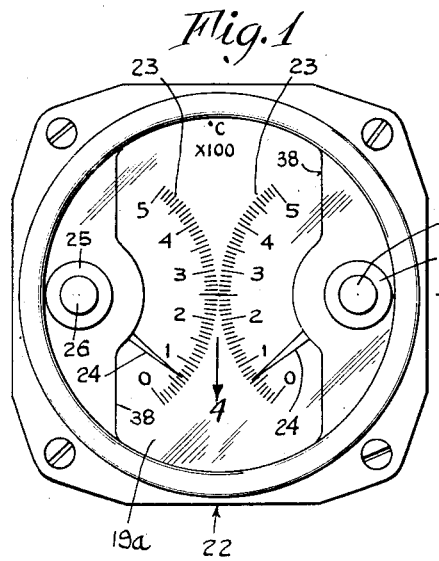
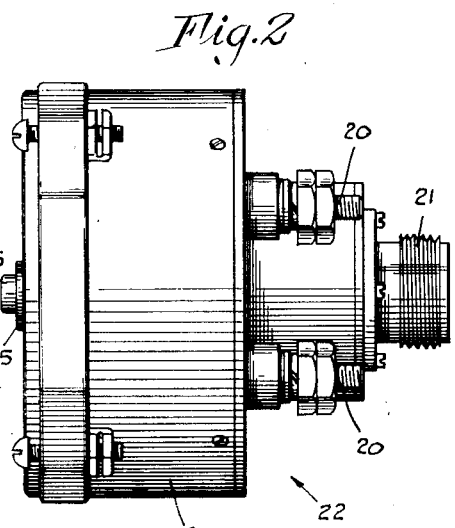
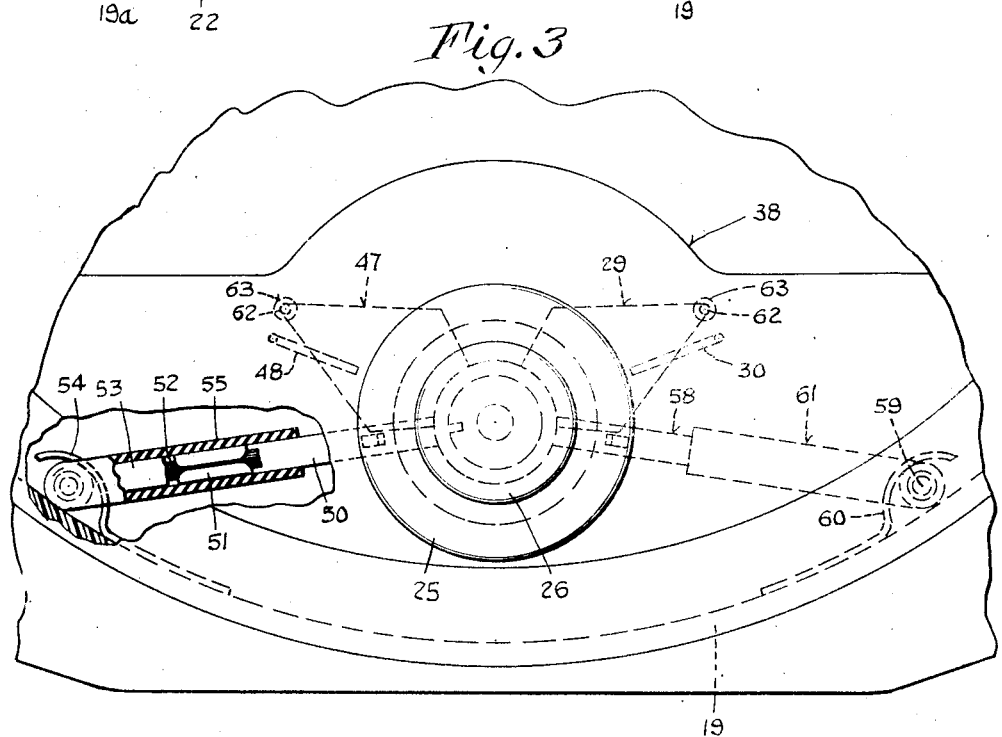
INVENTOR.
Knud J. Knudsen
BY
Johnson and Kline
ATTORNEYS

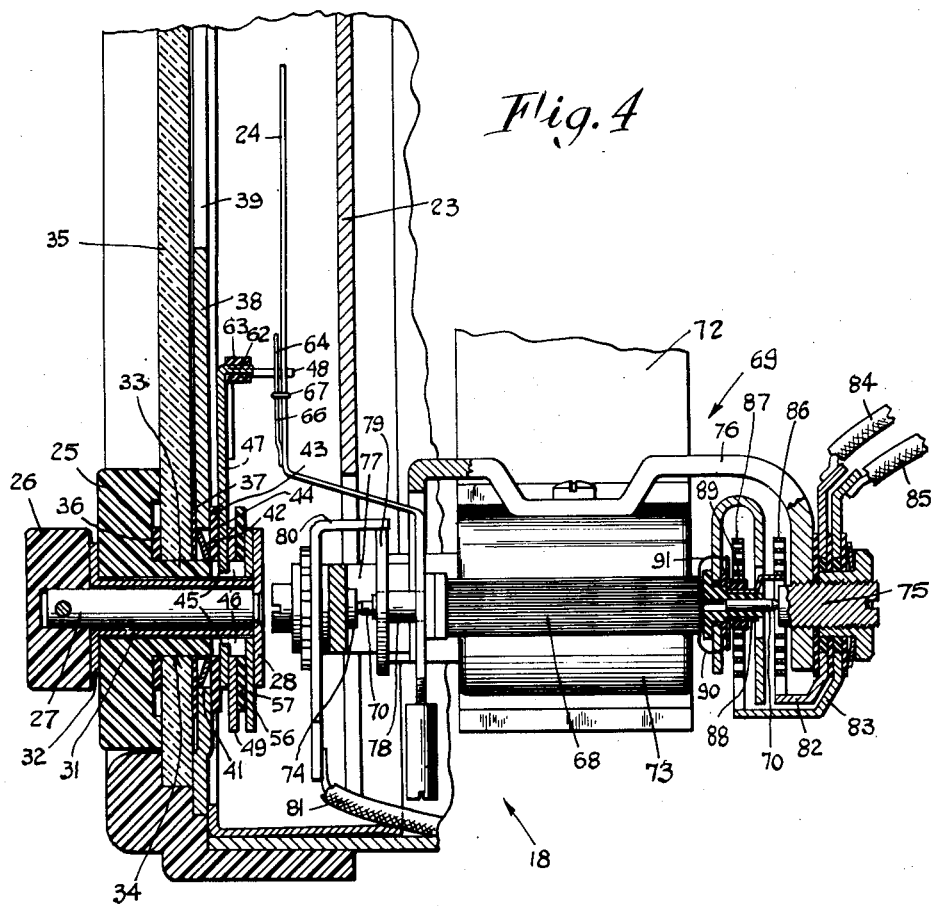
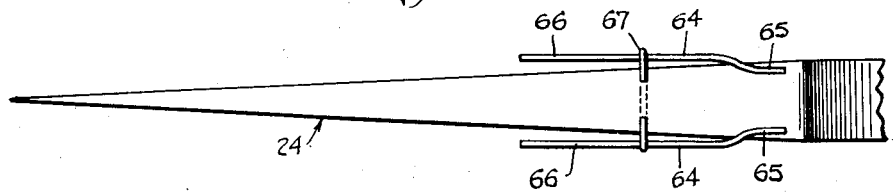

June 5, 1951 K. J. KNUDSEN 2,556,138
TEMPERATURE CONTROL USING VACUUM TUBE
Filed May 1, 1947 3 Sheets-Sheet 3

INVENTOR.
Knud J. Knudsen
BY
Johnson and Kline
ATTORNEYS

Patented June 5, 1951

2,556,138

UNITED STATES PATENT OFFICE 2,556,138

TEMPERATURE CONTROL USING VACUUM TUBE

Knud J. Knudsen, Naugatuck, Conn., assignor to The Lewis Engineering Company, Naugatuck, Conn., a corporation of Connecticut Application May 1, 1947, Serial No. 745,139

7 Claims. (Cl. 236—69)

This invention relates to the control and indication of temperatures, more particularly aircraft wing temperatures and the like wherein control is desirable in preventing dangerous ice formations from occurring during certain conditions.

An object of the invention is to provide a reliable and conveniently adjustable automatic temperature control and indicator device, and an improved method of temperature control having special utility in conjunction with aircraft wherein the wings are heated to prevent the formation of ice thereon.

Another object of the invention is to provide an indicator and control as above which is relatively simple and economical to fabricate.

In accomplishing these objects there is provided by the invention, as shown in the specific embodiment thereof illustrated herein, a novel organization including a heat-responsive device positionable on a wing of the aircraft in heat-exchanging relation therewith, and including a sensitive, electrical-instrument movement energized from said heat-responsive device in accordance with the wing temperatures and positionable in an accessible place, as in the aircraft cockpit, the instrument movement having a deflectable member and scale therefor whereby the temperatures of the wings may be read directly, and having specially arranged control contacts which are manually settable to various adjusted positions corresponding to temperature limits and are cooperable with special contacts carried by the deflectable member. A circuit is closed by the cooperable contacts when the deflectable member reaches a predetermined relatively large deflection, denoting the upper limit of wing temperature and another circuit closed when the member reaches a predetermined relatively small deflection, denoting the lower limit of wing temperature.

In conjunction with the said circuits a sensitive, holding-relay device including a vacuum tube is provided, the said device being triggered or controlled by the circuits and control contacts, and causing selective actuation of a powered valve mechanism which controls the heating medium for the wings.

The sensitive-instrument movement and contact arrangement associated therewith constitute a novel assemblage so organized as to provide a convenient indication of wing temperatures and at the same time enable quick and easy adjustment for actuation of the control at wing temperature limits which have been predetermined.

Other features and advantages will hereinafter appear.

In the accompanying drawings:

Figure 1 is a front elevation of a sensitive-instrument movement and control contact assemblage made in accordance with the invention.

Fig. 2 is a side view of the assemblage of Fig. 1.

Fig. 3 is an enlarged detail of the adjusting means of the assemblage, with the stationary adjustable contacts indicated by broken lines.

Fig. 4 is an enlarged fragmentary section on line 4—4 of Fig. 1.

Fig. 5 is an enlarged fragmentary elevation of the pointer and contact members thereon of the assemblage of Figs. 1 through 4.

Figure 6:
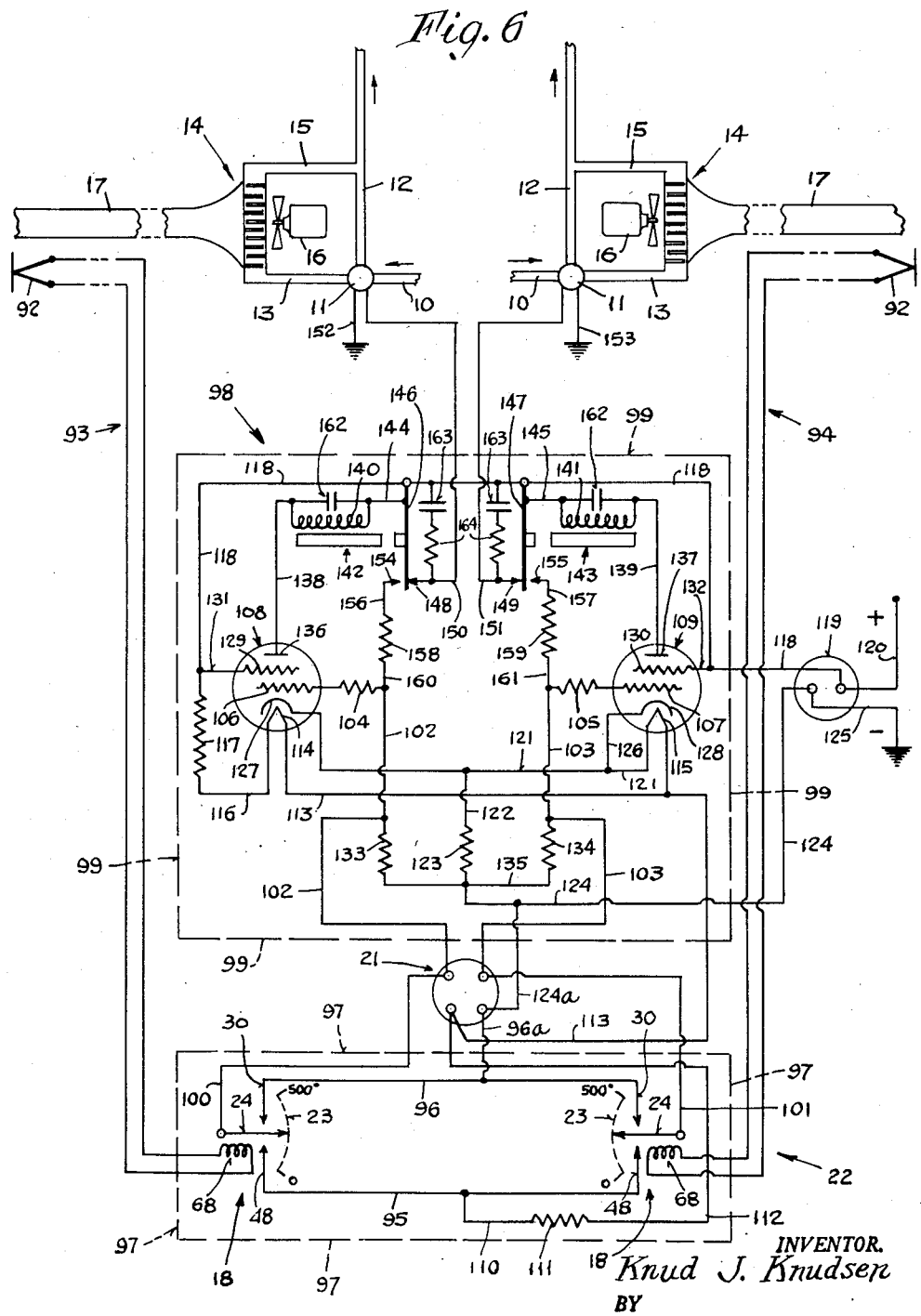
Fig. 6 is a schematic circuit diagram of the control device of the invention.

One method of preventing ice formation on the wings of an aircraft involves the heat of a fluid heating medium, in the form of the exhaust gases of the engines, which medium is diverted through radiators, the heat from which warms air driven through the wings to maintain them at temperatures above freezing. Such a system is illustrated in part in Fig. 6, wherein the exhaust gases from engines (not shown) are lead through pipes 10 to solenoid or power-operated valves 11 by which the heating medium may be controlled and directed either through discharge pipes 12 venting to the atmosphere, or through pipes 13 leading to radiators 14 from which vent pipes 15 discharge to the atmosphere. Power-driven fans 16 are associated with the radiators 14 for the purpose of driving warm air therefrom through conduits 17 which lead to the wings of the aircraft.

When the valves 11 are in one position, the radiators 14 are heated, causing the wings to be warmed, and when the valves 11 are in another position the radiators 14 are by-passed by the exhaust gases and the latter are vented directly to the atmosphere, enabling the wings to become cooled.

In accordance with the present invention a novel method and apparatus are provided for automatically controlling the temperature of the aircraft wings in a system such as the above, and for indicating the said temperatures. As shown, the apparatus includes a pair of novel assemblages 18 of sensitive-instrument movements and adjustable contact means associated therewith, the said assemblages being connected for triggering a control system whereby the valves 11 are automatically operated in response to the aircraft wings attaining upper and lower limits of temperature.

Referring to Figs. 1 and 2 the assemblages 18 are combined within an instrument casing 19 having terminal posts 20 and a conduit fitting 21 at the rear thereof, all so as to form a single unit 22. At its front the casing 19 has a window opening 19a revealing scales 23 carried within the casing 19 and traversed by pointers 24 associated respectively with the assemblages 18.

As shown in Figs. 1, 3 and 4 the casing 19 at its front carries pairs of manually operable knobs 25 and 26, the pairs being respectively associated with the assemblages 18. The knobs 25 and 26 of each pair are mounted in axial alignment with each other so as to have a common axis, the knob 26 being of smaller diameter than the knob 25 and being located in front of the knob 25.

Referring to Fig. 4 which shows one assemblage 18, the knob 26 thereof is secured to one end of a short shaft 27 the other end of which has affixed to it a flat hub 28. From the edge of the hub 28 a diamond-shaped arm 29 extends in a radial direction, having an L-shaped wire contact 30 for cooperation with contact means carried by the instrument pointer (to be later described).

The shaft 27 is rotatably carried in a sleeve 31 which has an outturned end flange 32 disposed between the knobs 25 and 26 to space the same. The knob 25, which is preferably formed of insulating material, has an integral hollow shank 33 through which the sleeve 31 extends and on which it has a bearing, the said shank 33 passing through an aperture 34 in a window panel 35.

On opposite sides of the window panel 35 and carried by the shank 33 are spacer washers 36 and 37, the latter washer being interposed between the panel 35 and a metal shield 38 which is cut away at 39 to enable the instrument pointer 24 to be seen through the panel 35. The shield 38 has an aperture 41 through which the shank 33 of the knob 25 extends, and clearance is provided between said shank and the edges of the aperture 41 to accommodate a crowned spring washer 42. At the rear of the shield 38 an insulating spacer washer 43 is carried on the shank 33, and in engagement with said washer there is provided a flat hub 44 having inwardly extended lugs 45 accommodated in slots 46 in the shank 33 by which the hub 44 is keyed to the shank.

A diamond-shaped arm 47 extends radially from the flat hub 44 and mounts an L-shaped wire contact 48 similar to the contact 30 on the arm 29.

In engagement with the hub 44 there is provided a flat washer 49 having an arm 50 extending therefrom, the said arm at its extremity 51 being clinched over the end of a conductor 52 of a lead wire 53, which wire is passed under a metal clamping strip 54 secured to the inside of the casing 19. By this arrangement electrical connection to the L-shaped wire contact 48 can be effected through the lead wire 53. As shown in Fig. 3 the wire 53 and arm 50 are encased in an insulating sleeve 55 by which these parts are electrically isolated from the clamping strip 54 and casing 19.

Between the flat washer 49 and flat hub 28 an insulating washer 56 and a second flat metal washer 57 are interposed, the latter washer being in engagement with the hub 28 and being insulated from the flat washer 49 by the washer 56. From the metal washer 57 an arm 58 extends, connected with a lead wire 59 clamped under a clamping strip 60, which latter is secured to the casing 19. The wire 59 and arm 58 are insulated from the strip 60 and casing by means of an insulating sleeve 61. Electrical connection to the L-shaped wire contact 30 is thus effected through the lead wire 59.

By this organization the contact carrying arm 29 and contact 30 thereof may be swung through an arc by turning the knob 26, and the arm 47 and contact 48 thereof may be swung through an arc by turning the knob 25.

The extremities of the arms 29 and 47 mount stop pins 62 which extend laterally from the arms and carry insulating bushings 63. The pins 62 and bushings 63 are so located that they may be made to engage each other when the arms 29 and 47 are swung toward each other by turning the knobs 25 and 26 in opposite directions, and therefore the relative movement of the said arms are limited thereby.

In accordance with the invention a novel contact organization is provided in conjunction with the instrument pointer 24, for cooperating with the wire contacts 30 and 48. Referring to Figs. 4 and 5, the pointer 24 has mounted on it a pair of resilient wire contacts 64 which extend longitudinally thereof along opposite side edges, the said contacts being co-extensive with each other and being secured to the pointer at corresponding ends 65, the remaining ends 66 being free for lateral movement. The wires 64 are positioned by a wire clamp 67 which is secured intermediate its ends to the pointer 24 and which hooks over the wires 64 and engages the outside surfaces thereof. The wires 64 are normally biased slightly so as to engage the positioning wire 67 under continual pressure.

The pointer 24 is secured to a movable coil 68 of a sensitive electric-instrument movement 69, the said coil being carried by pivots 70 which are aligned with the axis of the shaft 27 and shank 33 of the adjusting knobs. The pointer 24 is thus movable in an arc having a center in the said axis, which also contains the centers of the arcs of movement of the contact-carrying arms 29 and 47. Therefore, as clearly shown in Fig. 4, the contact wires 66 are positioned for engagement with the contact wires 30 and 48, one engagement taking place when the pointer 24 has a small deflection and the other engagement taking place when the pointer has a large deflection. The L-shaped contact wires 30 and 48 are relatively rigid, whereas the contact wires 64 are resilient, and therefore during engagement of one of the wires 64 with one of the wires 30, 48 the wire 64 may yield so that if substantial pressure is present the cooperable contact wire may also engage the adjacent side edge of the pointer 24, thus acting as a stop in preventing movement of the pointer past the contact arm carrying the contact wire.

The stop pins 62 are so located with respect to the wire contacts 30 and 48 that if the two arms 29 and 48 should be brought together to cause engagement of the pins, the wire contacts 30 and 48 will be spaced apart a distance greater than the width of the pointer 24 at the point nearest the contacts, thereby eliminating any possibility of distorting the pointer.

While in the enlarged view of Fig. 5 the contact wires 64 are shown as being spaced a substantial distance from the side edges of the pointer 24, actually such spacing is of very small magnitude. Therefore, with reasonably high accuracy, the contact-carrying arms 29 and 47 may be set or adjusted by turning their respective knobs 25 and 26, so as to cause engagement of the respective pairs of cooperable wire contacts to occur at predetermined deflected positions at the pointer 24, such positions being indicated on the scale 23 behind the pointer 24.

The contact pressures existing during engagement of the wire contacts are extremely light, and I therefore apply the term "micro-pressure" to describe the contacts. These light pressures between the contacts may be such that contact resistances as high as 500,000 ohms may exist; such contact resistances do not, however, impair the reliability of the operation of the present apparatus, since the contact wires are connected with the grids of sensitive vacuum tube relays (as will be hereinafter brought out) having high leakage resistances in their circuits.

The instrument movement 69 may have the conventional permanent magnet 72 and core 73, and may have bearings 74 and 75 cooperable with the pivots 70 and carried in brackets 76 and 77 respectively.

According to the invention the movements of the coil 68 are influenced by spiral hair springs which function as connecting means for both the pointer 24 and ends of the movable coil 68. As shown in Fig. 4 the pointer 24 is electrically connected through a sleeve 78 to a spiral hair spring 79 which is secured to a connector arm 80 insulatedly carried by the bearing 74 and connected with a lead wire 81. The other bearing 75 insulatedly carries a pair of connector arms 82 and 83 respectively connected to lead wires 84 and 85, the said arms also carrying respectively two spiral hair springs 86 and 87 whose inner ends are joined to metal sleeves 88 and 89 which are insulated from each other and are in turn connected through lead wires 90 and 91 to the coil 68.

Thus energization of the coil 68 is effected through the lead wires 84 and 85, and electrical connection to the pointer 24 is effected through the lead wire 81.

Referring to Fig. 6, temperature-responsive devices in the form of thermocouples 92 are provided for mounting on the wings of the aircraft to be influenced by the heating and cooling of the said wings. The thermocouples 92 are connected by two-wire cables 93 and 94 respectively to the movable coils 68 of the instrument movements of the assemblages 18 the connection being such that an increase in the temperature of either wing will cause the pointer 24 of the associated instrument movement to be deflected toward the high part of the scale 23, and vice versa. Thus the assemblages 18 and associated thermocouples 92 are translating mechanisms by which the wing temperatures are translated into deflections of deflectable members.

The scales 23 may be graduated in degrees and may indicate a range from zero degrees to 500 degrees, as shown in Figs. 1 and 6, so that the pointers 24 when traversing the scales between the limits established by the settings of the knobs 25 and 26 may indicate the wing temperatures.

The stationary wire contacts 48 of the instrument movements are connected together by a wire 95, and the other stationary wire contacts 30 of the movements are connected together by a wire 96. These connections are made within the casing 19 so as to be included in the unit 22 of which the casing is a part, the said unit being indicated by the broken lines 97 forming a rectangle in Fig. 6, and including the conduit fitting 21 which latter is indicated for purposes of clarity of illustration as being outside of the said rectangle. The unit 22 may be located in any convenient and accessible place in the aircraft, remote from the wings, as for instance in the cockpit of the craft on the instrument panel.

A holding relay device comprising a second unit 98, indicated by the broken lines 99 in Fig. 6, is adapted to be triggered or controlled by the assemblages 18 of the unit 22, and the said relay device may be located wherever space is available in the aircraft, either in the wings or fuselage thereof.

Connections between the holding relay device comprising the unit 98 and the assemblages 18 comprising the unit 22 are as follows: The pointers 24 of the assemblages 18 are connected by wires 100 and 101 respectively through the conduit fitting 21 to wires 102 and 103 which are joined respectively to grid resistors 104 and 105 (which may be of 4 megohms resistance each), said resistors being connected with control grids 106 and 107 of vacuum tubes 108 and 109 respectively. The wire 95 is connected by a wire 110 to a resistor 111, which may be of 20,000 ohms resistance, and which is connected by a wire 112 through the fitting 21 to a wire 113 connected to heaters 114 and 115 respectively of the vacuum tubes 108 and 109. The heater 114 is connected by a wire 116 to a current limiting heater resistor 117, which is in turn connected by a wire 118 through a connector fitting 119 to the positive supply wire 120 for the device. The heater 115 is connected by a wire 121 to a wire 122 connecting with a drop resistor 123 (which may be of 31 ohms resistance), the said resistor being connected by a wire 124 through the connector fitting 119 to the negative grounded supply wire 125 for the device. By these connections the heaters 114 and 115 are connected in series for energization from the supply wires 120 and 125.

The wire 121 is connected with the cathode 127 of the vacuum tube 108, and is connected by a wire 126 with the cathode 128 of the vacuum tube 109. Screen grids 129 and 130 of the vacuum tubes 108 and 109 are connected by wires 131 and 132 respectively to the wire 113 so as to be positively charged thereby.

The wires 102 and 103 are connected respectively with resistors 133 and 134, which may each be of 20 megohms resistance, the said resistors being connected by a wire 135 to the wire 124. The wire 124 is connected by wires 124a and 96a through the connector fitting 21 to the wire 96.

The anodes 136 and 137 of the vacuum tubes 108 and 109 are connected by wires 138 and 139 respectively to coils 140 and 141 of electro-responsive power control devices in the form of relays 142 and 143, the said coils being connected by wires 144 and 145 to the relay armatures 146 and 147.

Contacts 148 and 149 of the relays 142 and 143, which contacts are normally engaged by the armatures 146 and 147 when the relay coils 140 and 141 are deenergized, are connected by wires 150 and 151 respectively to the solenoid valves 11, which are connected by wires 152 and 153 to ground, thereby providing a return path to the negative supply wire 125.

Relay contacts 154 and 155 are provided for cooperation with the armatures 146 and 147 respectively, the said contacts being engaged by the armatures when the relay coils 140 and 141 are energized. The contacts 154 and 155 are connected by wires 156 and 157 respectively to resistors 158 and 159, which may be of 40 megohms resistance each, the said resistors being connected by wires 160 and 161 respectively to the wires 102 and 103.

To reduce chattering of the relay contacts, condensers 162 are bridged across the relay coils 140 and 141 respectively, and series-connected condensers 163 and resistors 164 are connected with the wire 118 and the wires 150 and 151 to reduce sparking.

The operation of the control device of this invention is as follows: Referring to Fig. 6, the relay armatures 146 and 147 are shown in engagement with the cooperable contacts 148 and 149, indicating that the relay coils 140 and 141 are deenergized since the armatures are normally biased for such engagement. This will result in the solenoid valves 11 being energized, since the positive supply wires 150 and 151 thereof are connected through the relay armatures 146 and 147 to the positive supply wire 118. The valves 11 when energized operate to divert through the venting or discharge pipes 12 the exhaust gases (from the engines) which pass into the pipes 10. The radiators 14 are thus by-passed by the exhaust gases and are not heated thereby.

In consequence, if the aircraft is flying through extremely cold atmosphere the temperatures of the wings will drop toward a point where, if the atmosphere contains moisture, ice formation on the wings would occur. As the wing temperatures drop, however, the pointers 24 of the instrument movements in the assemblages 18 will deflect along the scales 23 toward the zero ends of the scales.

The adjustable wire contacts 48 of the instrument movement assemblages are so adjusted that they are engaged by the wire contacts 64 of the pointers at some predetermined position prior to the pointers reaching the zero ends of the scales 23.

When this occurs it initiates an interval of time, as will be later brought out, wherein a positive potential will be applied to the control grids 106 and 107 of the vacuum tubes 108 and 109, rendering the said tubes operative by causing a plate or anode current to flow in each tube, all in the following manner: Consider first the supply wire 125 as being at zero positive potential. Due to the energization of the vacuum tube heaters 114 and 115 a potential drop will exist across the resistor 123, since this resistor is in series with the said heaters and with the current limiting resistor 117 in the heater energization circuit. As a result of the voltage drop existing across the resistor 123 the wire 122 will have a positive potential with respect to the supply wire 125, and this may be on the order of approximately 4½ volts if the potential difference between the supply wires 120 and 125 is on the order of 24 volts. Following the heater energizing circuit from the wire 122 through the wire 121 and heater 115 to the wire 113, it will be seen that a voltage drop exists across the heater 115, and this may be on the order of 5½ volts. This voltage drop added to the drop across the resistor 123 will result in the wire 113 having a positive potential of approximately 10 volts with respect to the negative supply wire 125. The wire 113, however, is connected through the wire 112 and resistor 111 to the wire 95 which joins together the stationary wire contacts 48 of the instrument assemblages 18, and when the said wire contacts are engaged by the instrument pointers 24 the wires 100 and 101 will be charged with the potential of the wire 113, namely approximately 10 volts positive, provided that no appreciable current is caused to flow through the resistor 111. This potential will appear on the wires 102 and 103 in turn, and be applied through the grid resistors 104 and 105 to the control grids 106 and 107 of the vacuum tubes 108 and 109. Such positive potential on the said control grids will render the tubes operative by causing appreciable anode current to flow in the anode circuits which include the relay coils 140 and 141, thereby energizing the said coils. In consequence of this the relay armatures 146 and 147 will be attracted and will separate from the contacts 148 and 149 and engage the contacts 154 and 155.

Separation of the armatures 146 and 147 from the contacts 148 and 149 will cause the solenoid valves 11 to be deenergized, and as a result the exhaust gases in the pipes 10 will be diverted through the pipes 13 and the radiators 14 causing the latter to become heated. The fans 16 will blow heated air from the radiators 14 through the conduits 17 into the wings of the aircraft, raising the temperatures of said wings.

Engagement of the relay armatures 146 and 147 with the contacts 154 and 155 will cause the positive potential of the wire 118 to be applied to the resistors 158 and 159, and result in the control grids 106 and 107 being maintained at a positive potential, and this provides a holding action by which the vacuum tubes 108 and 109 are maintained in operative condition should the positive potential applied to the control grids through the wires 102 and 103 be discontinued, as by the pointers 24 leaving the cooperable wire contacts 48.

As the wing temperatures increase the pointers 24 will first leave the cooperable wire contacts 48 and then traverse the scales 23 toward the upper limits thereof, and in so doing will indicate the values of the wing temperatures, and the vacuum tubes will remain operative due to the said holding action.

The adjustable wire contacts 30 having been placed in predetermined settings wherein the pointers 24 prior to reaching the high ends of the scales 23 will engage the said contacts 30, such action occurs if and when the wing temperatures continue to increase. By this engagement the positive potentials on the control grids 106 and 107 will be immediately reduced to a point where the vacuum tubes 108 and 109 are rendered inoperative, as through the anode currents in the wires 138 and 139 dropping to an inappreciable figure. This terminates the time interval initiated by engagement between the pointers 24 and wire contacts 48 and characterized by positive potential being applied to the control grids 106 and 107, and the reduction of potential is effected as follows: It will be noted that the negative supply wires 125 and 124 are connected through the wires 124a and 96a to the wire 96 which connects together the wire contacts 30, and therefore the contacts are maintained at zero potential, i. e. the same potential as the supply wire 125. When the pointers 24 engage the wire contacts 30 this zero potential will dominate the positive potential of the wires 100, 101 and 102, 103 and therefore the potential of the wires 102 and 103 will be lowered to substantially zero, thereby removing the positive potential from the control grids 106 and 107.

As a result of the vacuum tubes 108 and 109 becoming inoperative the relay armatures 146 and 147 will be released and will engage the cooperable contacts 148 and 149, thereby again energizing the solenoid valves 11 and causing the exhaust gases from the pipes 10 to be diverted through the pipes 12 and vented. In consequence of this the wings will again become cooled and the operation of the device repeated as described above.

It is pointed out that the resistor 159, which may be on the order of 40 megohms, is series-connected to the resistor 134, which is on the order of 20 megohms. The same is true for the resistors 158 and 133. These series-connected resistors will, whenever the relays 142 and 143 are energized, be placed directly across the supply voltage of the system, which is on the order of 24 to 28 volts. Thus it is seen that the values of the resistors 159 and 134 are so related to the voltage of the supply wires 120 and 125 that the current flowing through the resistors is not substantially in excess of several microamperes. Accordingly, when the contact 24 engages the contact 30 it does not handle any substantial amount of current, and therefore will not stick and render the device inoperative. Moreover, because of the drop-wire effect of the resistors 159 and 134, with a supply voltage of 24, for example, the potential on the wire 161 when the relay 143 is energized will be on the order of 8 volts, and the contacts 24 and 30 operating on such low voltage and with such low currents will not stick.

When the relay 143 is deenergized and the contact 24 is brought into engagement with the contact 30 the voltage existing between the contacts will be on the order of 10 volts for the reason that, considering the wire 124 as having zero voltage, the wires 122 and 121 will have approximately 4 volts and the wire 113 will have approximately 10 volts, due to the drops across the resistor 123 and the filament 115. Thus when the contacts 24 and 48 engage each other the potential difference (which is the charge initially placed on the grid 107) will be not greater than 10 volts, and only an inappreciable current will pass, thereby eliminating sticking of the contacts 24 and 48. Where micropressure contacts are employed, as in the present apparatus, the holding of the voltages and currents which the contacts handle to the small values mentioned is extremely important in preventing sticking of the contacts. It will be understood that such sticking could render the apparatus inoperative and useless.

In the above description of the operation of the control device, for brevity the sequence of operations was described as if both wings responded equally at all times to the heating medium, and as if the instrument assemblages 18 were set exactly alike and responded simultaneously, causing concurrent operation of the vacuum tubes 108 and 109, relays 142 and 143, and solenoid valves 11. However, obviously in practice one wing and one-half of the control device, comprising one instrument assemblage 18, vacuum tube, relay, and solenoid valve 11 will operate independently of the other wing and other half of the control device comprising the other instrument assemblage 18, vacuum tube, relay, and solenoid valve 11.

There is thus provided by the present invention an automatic control whereby by the wings of an aircraft are maintained at temperatures which prevent the formation of ice thereon. The lowermost predetermined limits of temperature at which the wings will start to be warmed (and smallest predetermined deflections of the pointers 24) may be quickly and conveniently adjusted by turning the knobs 25 and the uppermost predetermined limits of temperature at which the wings are permitted to cool off (and greatest predetermined deflections of the pointers 24) may be adjusted by turning the knobs 26, such adjustment being effected from the cockpit and being under the control of the pilot at all times.

Simultaneously with the automatic control of the wing temperatures indications or readings of the said temperatures are given by the pointers 24 and scales 23, and thus the pilot may determine at a glance the effectiveness and operativeness of the automatic control.

The settings of the stationery adjustable wire contacts 30 and 48 may be determined with satisfactory accuracy by observing the uppermost and lowermost limits of movement of the pointers 24.

While the invention is illustrated herein as applied to the control of temperature of aircraft wings, it should be understood that it has utility in controlling the temperature of other instrumentalities, and therefore is not to be limited to the specific application illustrated.

Variations and modifications may be made within the scope of this invention and portions of the improvements may be used without others.

I claim:

1. An automatic temperature regulator for use with a heat control, comprising an electro-responsive device; means responsive to energization and deenergization of said device, for selectively actuating the heat control; a vacuum tube having a cathode, anode and a control grid; means for selectively energizing and deenergizing the electro-responsive device in response to conduction and non-conduction of said tube; current-supply means having positive terminals of high and low voltage; means for charging the anode of the tube from the high voltage terminal positively with respect to said cathode; a member deflectable in response to heat; means connected with said current-supply means, for normally charging the grid negatively with respect to the cathode to render the tube non-conducting; means responsive to said deflectable member attaining one deflected position, nullifying said immediately preceding means and charging the grid from said low voltage terminal positively with respect to the cathode to render the tube conducting; and holding means responsive to said tube becoming conducting, charging said grid from the high voltage terminal positively with respect to the cathode, to maintain the tube conducting.

2. An automatic temperature regulator for use with a heat control, comprising an electroresponsive device; means responsive to energization and deenergization of said device, for selectively actuating the heat control; a vacuum tube having a cathode, anode and a control grid; means for selectively energizing and deenergizing the electro-responsive device in response to conduction and non-conduction of said tube; current-supply means having positive terminals of high and low voltage; means for charging the anode of the tube from the high voltage terminal positively with respect to said cathode; a member deflectable in response to heat; means connected with said current-supply means, for normally charging the grid negatively with respect to the cathode to render the tube nonconducting; means responsive to said deflectable member attaining one deflected position and including micro-pressure contacts actuated by the deflectable member, nullifying said immediately preceding means and charging the grid from said low voltage terminal positively with respect to the cathode to render the tube conducting; and holding means responsive to said tube becoming conducting, charging said grid from the high voltage terminal positively with respect to the cathode, to maintain the tube conducting.

3. An automatic temperature regulator for use with a heat control, comprising an electro-responsive device; means responsive to energization and deenerization of said device, for selectively actuating the heat control; a vacuum tube having a cathode, anode and a control grid; means for selectively energizing and deenergizing the electro-responsive device in response to conduction and non-conduction of said tube; current-supply means having positive terminals of high and low voltage; means for charging the anode of the tube positively from the high voltage terminal positively with respect to said cathode; a member deflectable in response to the heat; means connected with said current-supply means, for normally charging the grid negatively with respect to the cathode to render the tube non-conducting; means responsive to said deflectable member attaining one deflected position, nullifying said immediately preceding means and charging the grid from said low voltage terminal positively with respect to the cathode to render the tube conducting; holding means responsive to said tube becoming conducting, charging said grid from the high voltage terminal positively with respect to the cathode, to maintain the tube conducting; and means responsive to the deflectable member attaining another deflected position, nullifying said holding means and charging the grid negatively with respect to the cathode, to again render the tube conducting.

4. An automatic temperature regulator for use with a heat control, comprising an electro-responsive device; means responsive to energization and deenergization of said device, for selectively actuating the heat control; a vacuum tube having a cathode, anode and a control grid; means for selectively energizing and deenergizing the electro-responsive device in response to conduction and non-conduction of said tube; current-supply means having positive terminals of high and low voltage; means for charging the anode of the tube positively from the high voltage terminal positively with respect to said cathode; a member deflectable in response to the heat; means connected with said current-supply means, for normally charging the grid negatively with respect to the cathode to render the tube non-conducting; means responsive to said deflectable member attaining one deflected position, nullifying said immediately preceding means and charging the grid from said low voltage terminal positively with respect to the cathode to render the tube conducting; holding means responsive to said tube becoming conducting, charging said grid from the high voltage terminal positively with respect to the cathode, to maintain the tube conducting, said holding means including a current-limiting resistor having a value with respect to the voltage of the high voltage terminal whereby it will pass a current not substantially in excess of several microamperes when subjected to such voltage; and means responsive to the deflectable member attaining another deflected position and including micro-pressure contacts actuated by the deflectable member, nullifying said holding means and charging the grid negatively with respect to the cathode, to again render the tube conducting.

5. The invention as defined in claim 1, in which the current-supply means having positive terminals includes a circuit comprising a filament heating the cathode of the vacuum tube and comprising a resistor connected to the current-supply means and to said filament.

6. The invention as defined in claim 1, in which the means normally charging the grid negatively with respect to the cathode includes a current-limiting resistor connected with the current-supply means, and in which the holding means includes a second current-limiting resistor connected in series with the first resistor, said resistor constituting a drop wire governing the voltage of the charge placed on the grid when the holding means is operative.

7. The invention as defined in claim 6, in which there is means, including micro-pressure contacts, nullifying said holding means and charging said grid negatively with respect to the cathode in response to the deflectable member attaining another deflected position, thereby to again render the tube non-conducting, and in which the values of the resistors are so related to the voltage of the current-supply means that the current flowing through the resistors is not substantially in excess of several microamperes whereby sticking of said micro-pressure contacts is prevented.

KNUD J. KNUDSEN.

REFERENCES CITED

The following references are of record in the file of this patent:

UNITED STATES PATENTS

| Number | Name | Date |
|---|---|---|
| 1,651,236 | Thwing | Nov. 29, 1927 |
| 1,787,176 | Spitzglass | Dec. 30, 1930 |
| 1,956,753 | Bower | May 1, 1934 |
| 2,114,853 | McMaster et al. | Apr. 19, 1938 |
| 2,278,113 | Moreau | Mar. 31, 1942 |
| 2,316,240 | Harrison | Apr. 13, 1943 |
| 2,437,318 | Field | Mar. 9, 1948 |